(12) United States Patent
Tsai

(10) Patent No.: US 7,551,224 B2
(45) Date of Patent: Jun. 23, 2009

(54) DIGITAL CAMERA MODULE WITH AUTO-FOCUSING FUNCTION

(75) Inventor: Kun-Jun Tsai, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 617 days.

(21) Appl. No.: 11/336,240

(22) Filed: Jan. 20, 2006

(65) Prior Publication Data

US 2006/0170814 A1     Aug. 3, 2006

(30) Foreign Application Priority Data

Jan. 29, 2005     (CN) .................. 2005 2 0054535

(51) Int. Cl.
*H04N 5/232* (2006.01)
*H04N 5/225* (2006.01)

(52) U.S. Cl. .................. 348/357; 348/373; 348/374

(58) Field of Classification Search .................. 348/357, 348/373, 374
See application file for complete search history.

(56) References Cited

U.S. PATENT DOCUMENTS

| | | | | |
|---|---|---|---|---|
| 5,612,740 A * | 3/1997 | Lee et al. | ..................... | 348/345 |
| 6,421,088 B1 * | 7/2002 | Lee | .............................. | 348/347 |
| 6,453,123 B1 * | 9/2002 | Oshima | ........................ | 396/79 |
| 2006/0001759 A1 * | 1/2006 | Raschke | ...................... | 348/335 |
| 2007/0154198 A1 * | 7/2007 | Oh et al. | ........................ | 396/85 |

* cited by examiner

*Primary Examiner*—James M Hannett
(74) *Attorney, Agent, or Firm*—Steven M. Reiss

(57) ABSTRACT

The digital camera module with an auto-focusing function includes a lens barrel (10), a lens mount (20) and an image pick-up sensor (50). The lens barrel has at least one lens (14) positioned therein. The lens mount includes a first frame (22), a second frame (24), an adjusting mechanism, and a driving mechanism (40). The first frame and the second frame are spaced apart. The lens barrel is mounted on and/or within one of the first frame and the second frame. The adjusting mechanism is connected with the first frame and the second frame and configured to be extendable. The magnetism-based driving mechanism is configured to drive and selectably extend the adjusting mechanism. The image pick-up sensor is disposed on the other one of the first frame and the second frame.

12 Claims, 4 Drawing Sheets

DIGITAL CAMERA MODULE WITH AUTO-FOCUSING FUNCTION

BACKGROUND OF THE INVENTION

1. Field of the Invention

The present invention relates generally to a digital camera module with an auto-focusing function and, more particularly, to a small-sized digital camera module with an auto-focusing function and to a portable electronic device, such as a mobile phone or a Personal Digital Assistant (PDA), having such a camera module mounted therein.

2. Discussion of the Related Art

Recently, with the development of wireless communication technologies, there are many cases where digital cameras are mounted in, e.g., mobile phones or PDAs.

Generally, digital cameras are image recording media capable of photographing a plurality of still images without using film. Such a digital camera typically uses an image pickup device, which is a kind of semiconductor device, such as a Charge Coupled Device (CCD) or Complementary Metal Oxide Semiconductor (CMOS). In the digital camera, an object image formed on the image pickup device through a lens is converted into an electrical signal by the image pickup device, and the electrical signal is stored as a digital signal, e.g., in the camera unit or in a mobile phone or PDA in which the digital camera is mounted.

Since the digital camera is desirably mounted in small mobile phones or PDAs, a fixed focus lens module is usually used to facilitate mounting thereof within such a small mobile device. However, images photographed by a digital camera module with a fixed focus lens module tend to be poor in quality. It is partly due to the fixed focus lens, which is incapable of adjusting focal length to make a clearer image.

What is needed, therefore, is a digital camera module with an auto-focusing function, which satisfies the needs for performance enhancement, downsizing, and power saving.

SUMMARY OF THE INVENTION

A digital camera module with auto-focusing function is adapted for use in a foldable electronic device. The digital camera module with an auto-focusing function comprises lens barrel, a lens mount, and an image pick-up sensor. The lens barrel has at least one lens positioned therein. The lens mount includes a first frame, a second frame, an adjusting mechanism, and a driving mechanism. The first frame and the second frame are spaced apart. The lens barrel is mounted on and/or within one of the first frame and the second frame and is thus carried thereby The adjusting mechanism is connected with the first frame and the second frame and is configured to be extendable. The driving mechanism is configured to drive and selectably extend the adjusting mechanism. The image pick-up sensor is disposed on the other one of the first frame and the second frame. The image pick-up sensor is configured for receiving light from the at least one lens, the light corresponding to an image being received by the digital camera module.

A main advantage of the digital camera module with auto-focusing function is that driving of the telescopic movement of the lens barrel is achieved by changing an environmental magnetic field of the adjusting mechanism. The digital camera module thus has a simple, compact structure.

Other advantages and novel features will become more apparent from the following detailed description when taken in conjunction with the accompanying drawings.

BRIEF DESCRIPTION OF THE DRAWINGS

Many aspects of the digital camera module with an auto-focusing function can be better understood with reference to the following drawings. The components in the drawings are not necessarily to scale, the emphasis instead being placed upon clearly illustrating the principles of the present digital camera module with an auto-focusing function. Moreover, in the drawings, like reference numerals designate corresponding parts throughout the several views.

DETAILED DESCRIPTION OF PREFERRED EMBODIMENTS

Figure 1:
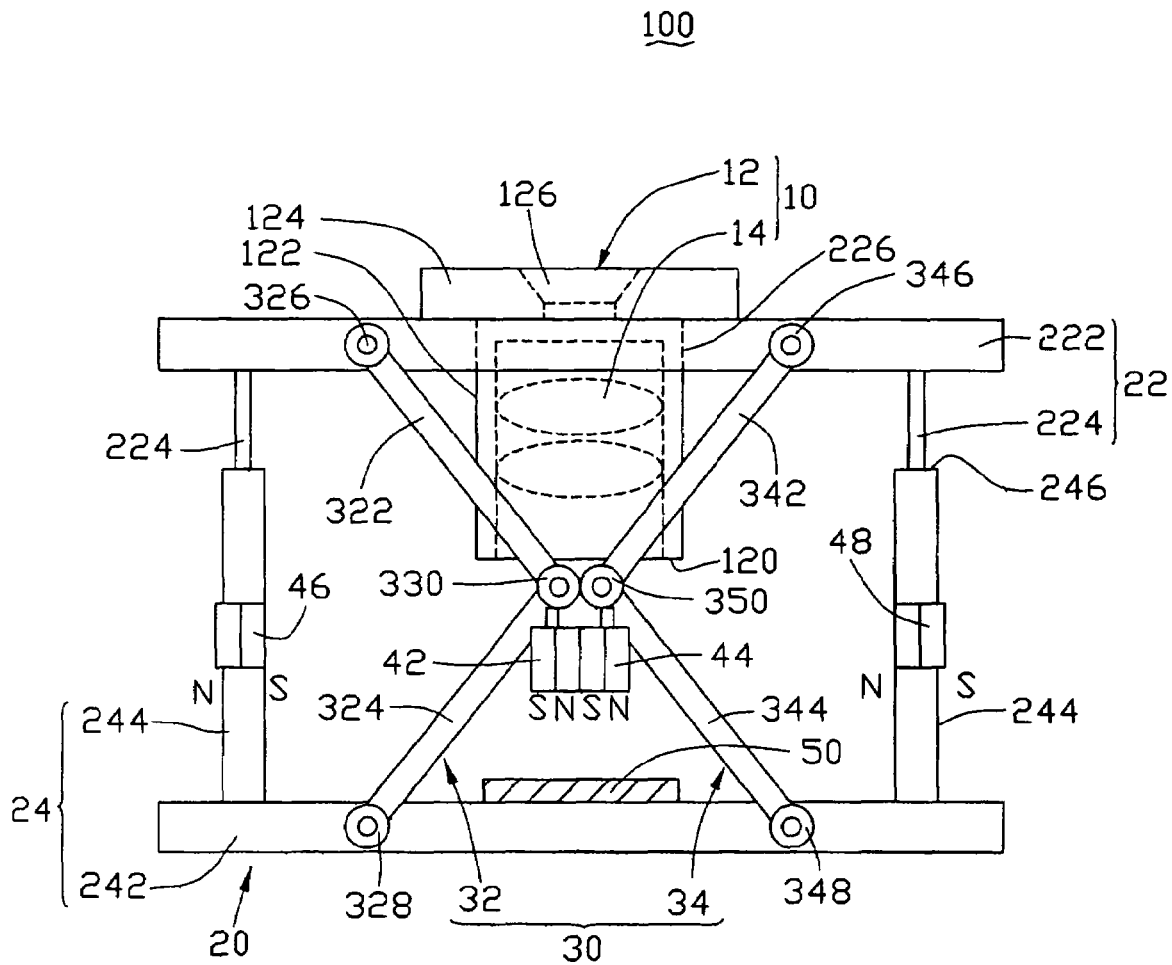
FIG. 1 is an schematic view of a digital camera module in a first position with an auto-focusing function, in accordance with a first preferred embodiment.

Referring now to the drawings, FIG. 1 shows a digital camera module 100 with an auto-focusing function, according to a first preferred embodiment. The digital camera module 100 is adapted for use in portable electronic device (not shown), such as a mobile phone or a Personal Digital Assistant (PDA), but the compact nature thereof could prove useful in compact digital camera units or digital camcorders, as well. The digital camera module 100 includes a lens module 10, a lens mount 20, and an image pickup sensor 50. The lens module 10 is mounted on the lens mount 20 and can be moved relative to the image pickup sensor 50, via the lens mount 20.

The lens module 10 includes a lens barrel 12 and a plurality of lenses 14 received in the lens barrel 12. The lens barrel 12 is a hollow cylinder with an open end 120. The lens barrel 12 includes a cylindrical body 122 and an enlarged top portion 124, integrally formed with the cylindrical body 122. The enlarged top portion 124 has a hole 126 defined therein so that light beams associated with the image being received can be transmitted therethrough. The lenses 14 are received in the hollow cylindrical body 122 of the lens barrel 12.

The lens mount 20 includes a top frame 22, a bottom frame 24, an adjusting mechanism 30, and a driving mechanism 40. The top frame 22 can move away or toward the bottom frame 24 via the adjusting mechanism 30 under the effect of the driving mechanism 40.

The top frame 22 includes a top plate 222 and two posts 224 symmetrically extending downwardly from opposing sides of the bottom of the top plate 222. The top plate 222 has a through hole 226 defined in the middle portion thereof The size of the through hole 226 corresponds to the outer diameter of the cylindrical body 122 of the lens barrel 12 so that the cylindrical body 122 of the lens barrel 12 extends therethrough. Accordingly, the cylindrical body 122 of the lens barrel 12 is received within the through hole 226 of the top plate 222 and is mounted therein, e.g., via screw threading, adhesive, and/or metallurgical bonding.

The bottom frame 24 includes a bottom plate 242 and two sleeves 244 symmetrically extending upwardly from opposing sides of the top thereof. Each sleeve 244 is a hollow cylinder with an open end 246 opposite to the bottom plate 242. The inner diameter of each sleeve 244 is larger than the diameter of each post 224 so that the post 224 can be inserted into the sleeve 244 via the open end 246. Accordingly, each post 224 is slidably movable/retractable within the corresponding sleeve 244. The image pick-up sensor 50 is disposed on the bottom plate 242 and aligns with the open end 120 of the lens barrel 112 of the lens module 10. As such, the lens barrel 12 of the lens module 10 is capable of routing the input light beams, corresponding to an image being photographed, to the image pick-up sensor 50. The image pick-up sensor 50 can, for example, be a Complementary Metal-Oxide Semiconductor (CMOS) type sensor or a Charge Coupled Device (CCD). The image pick-up sensor 50 is electrically connected with a printed circuit board (not labeled) so that an image signal can be output to a signal processing unit (not labeled).

The adjusting mechanism 30 includes a first extendable shaft 32 and a second extendable shaft 34. The first extendable shaft 32 and the second extendable shaft 34 are mirror-symmetrically disposed between the top plate 222 and the bottom plate 242. The first extendable shaft 32 includes a first shaft arm 322 and a second shaft arm 324. The first shaft arm 322 is pivotally connected with the top plate 222 of the lens mount 20, via a first hinge 326. The second shaft arm 324 is pivotally connected with the bottom plate 242 of the lens mount 20, via a second hinge 328. The first shaft arm 322 is pivotally connected with the second shaft arm 324, via a third hinge 330. The second extendable shaft 34 also includes a first shaft arm 342 and a second shaft arm 344. The first shaft arm 342 is pivotally connected with the top plate 222 of the lens mount 20, via a fourth hinge 346. The second shaft arm 344 is pivotally connected with the bottom plate 242 of the lens mount 20, via a fifth hinge 348. The first shaft arm 342 is pivotally connected with the second shaft arm 344, via a sixth hinge 350.

The driving mechanism 40 is configured for selectively using at least one of magnetic attraction and repulsion for the force needed to move the adjusting mechanism 30. The driving mechanism 40 includes a first electric magnet 42, a second electric magnet 44, a third electric magnet 46, and a fourth electric magnet 48. The first and the second electric magnet 42, 44 are respectively pivotally connected to the first hinge 326, 346 of the adjusting mechanism. The third and the fourth electric magnet 46, 48 are secured on one respective sleeve 244. The first electric magnet 42, the second electric magnet 44, the third electric magnet 46, and the fourth electric magnet 48 are arranged to align with each other.

In use, the digital camera module 100 is equipped within a portable electronic device (not shown), such as mobile phone, and the driving mechanism 40 is electrically connected with a circuit board of the mobile phone for capturing electrical power. When the driving mechanism 40 is induced with a current flow, a magnetic field is produced. Thus, a magnetic force that may be a magnetic attractive force or a magnetic repulsive force is generated between the four electric magnets 42, 44, 46, 48. When the pole arrangement of the four electric magnets is N pole, S pole, S pole, N pole, S pole, N pole, N pole, S pole from the left to the right, the first extendable shaft 32 and the second extendable shaft 34 adjoin each other because of a magnetic attractive force between the first electric magnet 42 and the second electric magnet 44 and because of a simultaneous magnetic repulsive force between the third electric magnet 46 and the first electric magnet 42 and between the second electric magnet 44 and the fourth electric magnet 48. Accordingly, the top plate 222 of the top frame 22 has a first position relative to the bottom frame 24 (i.e., a minimum separation distance), as shown in FIG. 1, and the lens module 10 has a first focus length.

Figure 2:
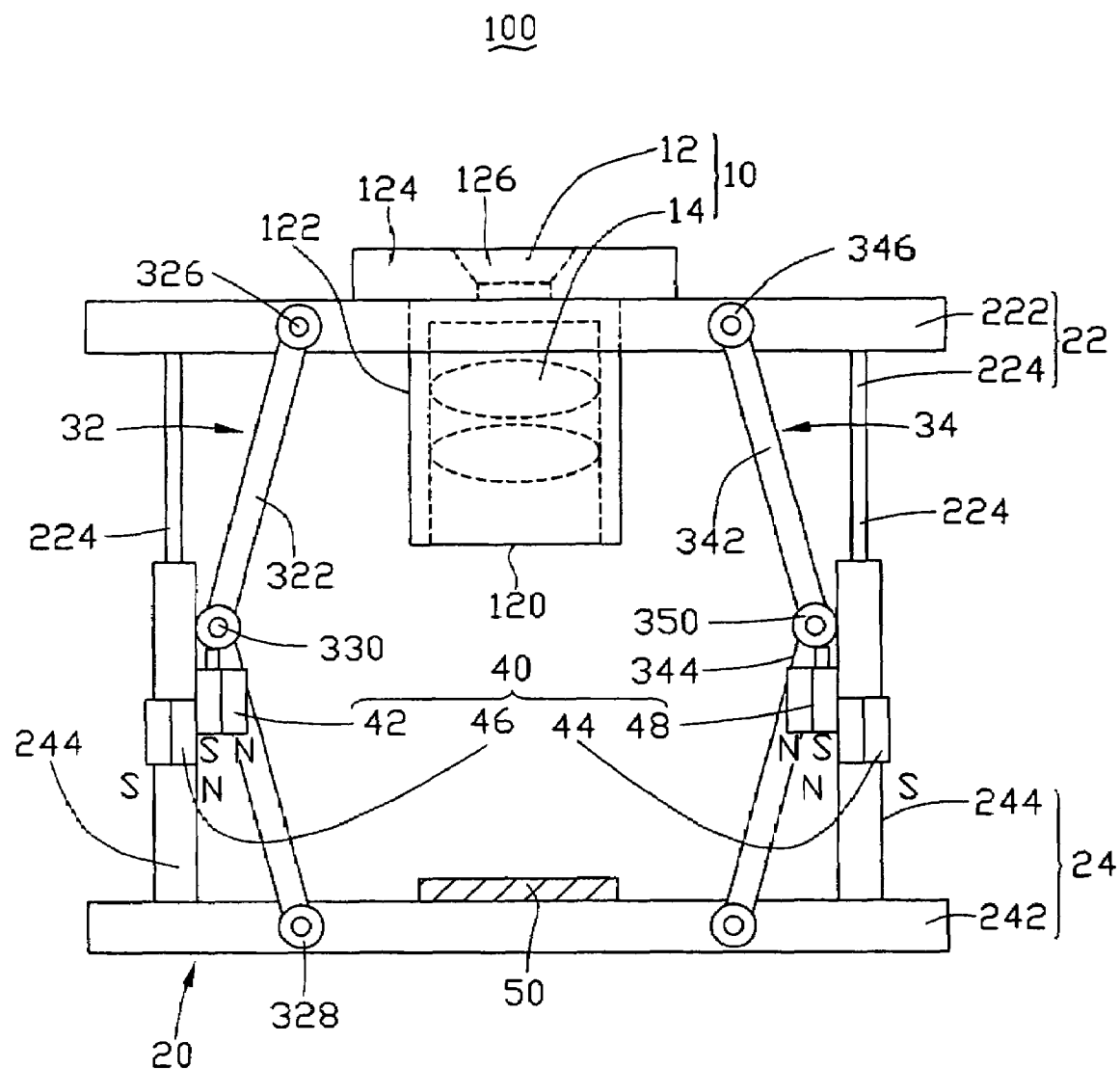
FIG. 2 is similar to FIG. 1, but shows a second position of the digital camera module.

Referring to FIG. 2, when the pole arrangement of the four magnets is S pole, N pole, S pole, N pole, N pole, N pole, N pole, S pole from the left to the right, the first extendable shaft 32 and the second extendable shaft 34 move away from each other because of a magnetic repulsive force between the first electric magnet 42 and the second electric magnet 48 and, concurrently, because of a magnetic attractive force between the first electric magnet 42 and the third electric magnet 46 and between the second electric magnet 44 and the fourth electric magnet 48. The posts 224 move upwardly in the corresponding sleeves 244, and the top plate 222 moves away from the bottom plate 242. Accordingly, the top plate 222 of the top frame 22 has a second position relative to the bottom frame 24 (i.e., a maximum separation distance), and the lens module 10 has a second focus length. Thus, the focusing purpose is achieved by changing the distance between the image pick-up sensor 50 and the lenses 14 in the lens barrel 12.

It can be understood that the top plate 222 may have one or more further positions between the first position and the second position by changing the current flow, thus changing the pole arrangement of the four electric magnets 42, 44, 46, 48. Thus, the magnetic force between them changes accordingly, which makes a distance between the first extendable shaft 32 and the second extendable shaft 34 changed. Accordingly, intermediate focal positions between the two illustrated in FIGS. 1 and 2 may be achievable using the present focusing system.

A main advantage of the digital camera module 100 with an auto-focusing function is that driving the telescopic movement of the lens barrel 12 is achieved by changing environmental magnetic field of the four electric magnets 42, 44, 46, 48. The digital camera module 100 thus has a simple, compact structure.

Figure 3:
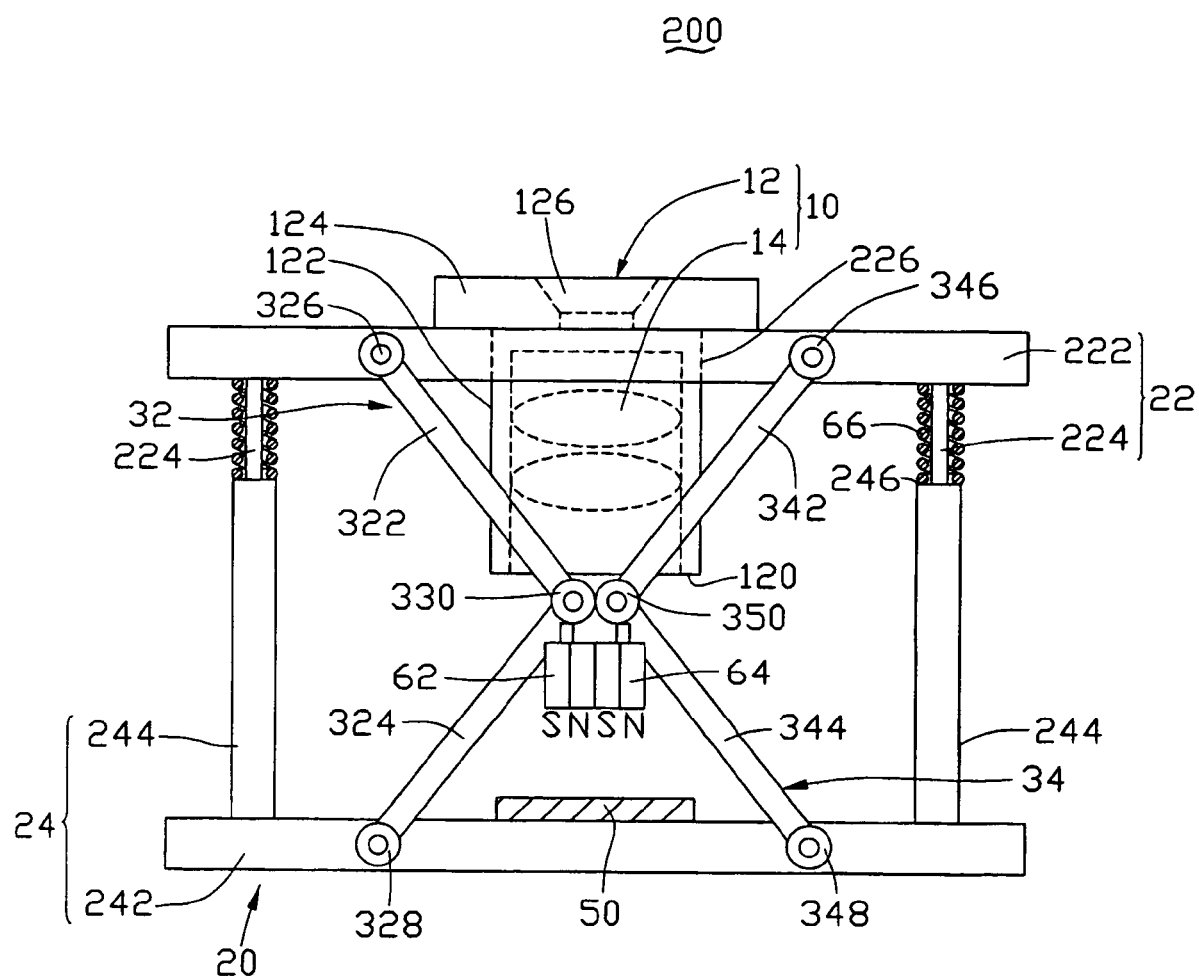
FIG. 3 is an schematic view of a digital camera module in a first position with an auto-focusing function, in accordance with a second preferred embodiment.

Referring to FIG. 3, a digital camera module 200 is provided according to a second preferred embodiment. The structure of the digital camera module 200 is essentially same as the digital camera module 100 except that driving mechanism 60 is used in place of the driving mechanism 40. The driving mechanism 60 only includes a first electric magnet 62, a second electric magnet 64, and two springs 66 as a resilient member. The first and the second electric magnets 62, 64 are secured on one respective sleeve 244. Each spring 66 is advantageously coil spring, although it is to be understood that other spring configurations could potentially be employed. The inner diameter of the spring 66 is larger than the diameter of the post 224 of the top frame 22 to permit movement therebetween. The outer diameter of each spring 66 is less than that of the sleeve 244, thereby allowing the top/upper distal end of each sleeve 244 to act as a stop limit surface for the corresponding spring 66. Each spring 66 is placed around one respective post 224. One end of each spring 66 resists the bottom of the top plate 222 of the top frame 22, and the other end of each spring 66 resists the top of the corresponding sleeve 244.

In use, the digital camera module 200, like the digital camera module 100, can be equipped within a portable electronic device, such as mobile phone, or can be part of a digital camera unit or camcorder. The driving mechanism 60 is electrically connected with a circuit board of the mobile phone or camera unit for capturing electrical power. The spring 66 is compressed to a maximum state (i.e., a minimum spring height), and the top plate 222 is urged by a maximum spring force of the spring 66. The driving mechanism 60 can be induced with a current flow, and a magnetic field is produced. Thus, a magnetic force that may be a magnetic attractive force or a magnetic repulsive force is generated between the two electric magnets 62, 64.

When the pole arrangement of the two electric magnets is S pole, N pole, S pole, N pole from the left to the right, a magnetic attractive force is generated between the two electric magnets 62, 64, which makes the first extendable shaft 32 and the second extendable shaft 34 move toward each other. When the magnetic attractive force meets or exceeds the maximum spring force of the spring 66, the first extendable shaft 32 and the second extendable shaft 34 are able contact with each other, as shown in FIG. 3. Accordingly, the top plate 222 of the top frame 22 has a first position relative to the bottom frame 24 (i.e., a minimum separation distance), as shown in FIG. 3, and the lens module 10 has a first focus length.

Figure 4:
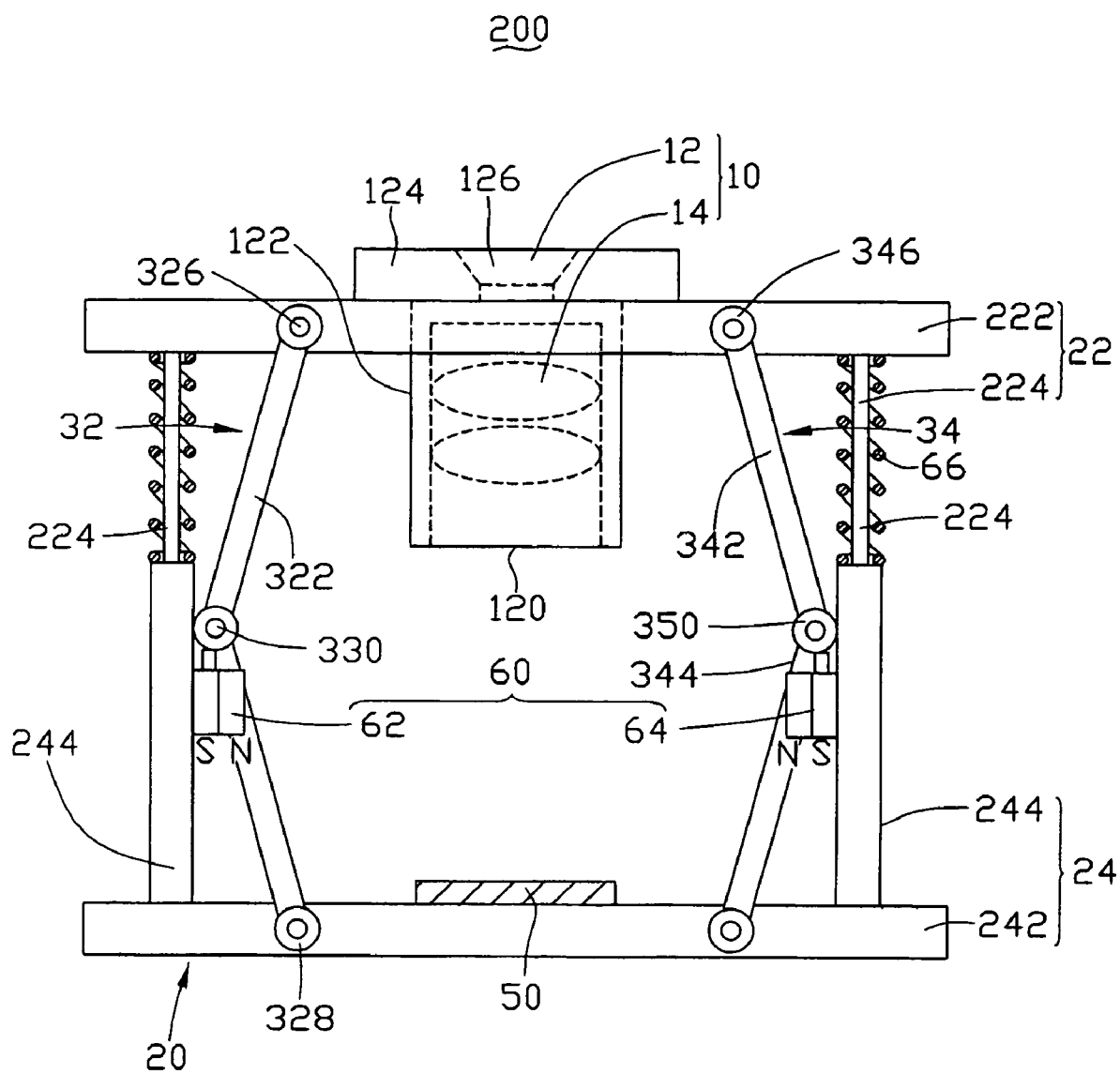
FIG. 4 is similar to FIG. 3, but shows a second position of the digital camera module.

Conversely, when the pole arrangement of the two electric magnets is S pole, N pole, N pole, S pole from the left to the right by changing a direction of the current flow, a magnetic repulsive force is generated between the two electric magnets 62, 64. The posts 224 move upwardly in the corresponding sleeves 244, and the top plate 222 will move away the bottom plate 242 of the bottom frame 24 under the maximum spring force of the spring 66 and the magnetic repulsive force, as shown in FIG. 4. Accordingly, the top plate 222 of the top frame 22 has a second position relative to the bottom frame 24 (i.e., a maximum separation distance), as shown in FIG. 4, and the lens module 10 has a second focus length. Thus, the focusing purpose is achieved by changing the distance between the image pick-up sensor 50 and the lenses 14 in the lens barrel 12. It can be seen that when the driving mechanism 60 is not induced with a current flow, no magnetic field is produced. When there is no magnetic force produced between the first and the second electric magnets 62, 64, the posts 224, under the maximum spring force of the spring 66, move upwardly in the corresponding sleeves 244, and the top plate 222 also will move away the bottom plate 242 of the bottom frame 24.

It can be understood that the top plate 222 of the top frame 22 may have at least a third position between the first position and the second position by changing a value of the current flow, thus changing attractive force between the two electric magnets 62, 64. Thus, as the magnetic force between them changes accordingly, the distance between the first extendable shaft 32 and the second extendable shaft 34 changes.

In an alternative embodiment of the digital camera module 200, the spring 60 can be omitted. In such an embodiment, when there is not any magnetic force produced between the first and the second electric magnets 62, 64, the top plate 222 has a first position where the top plate 222 of the top frame 23 contacts with the sleeves 244 of the bottom frame 24 and is supported thereby. When the first and the electric magnets 62, 66 are induced with a current flow, a magnetic field is produced. When a magnetic repulsive force is generated between the two electric magnets 62, 64, the extendable shaft 32 and the extendable shaft 34 move away from each other under the magnetic repulsive force between the two electric magnets 62, 64. Thus, the posts 224 move upwardly in the corresponding sleeves 244, and the top plate 222 moves away the bottom plate 242 of the bottom frame 24 because of the urging of the extendable shafts 32, 34. Accordingly, the top plate 222 has a second position.

In a further alternative embodiment, each post 224 can be another extending portion such as a projecting wall extending from the top plate 222 of the top frame 22. The sleeve 244 can be another hollow support portion such as a hollow sidewall extending from the bottom plate 242 of the bottom frame 24. The size of the projecting wall is, in such an embodiment, less than that of the hollow sidewall. The projecting wall can be inserted into the hollow sidewall and is able to move relative to the hollow sidewall.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A digital camera module with an auto-focusing function, comprising:
   a lens barrel having at least one lens positioned therein;
   a lens mount including:
   a first frame;
   a second frame, the first frame and the second frame being spaced apart, the lens barrel being carried by one of the first frame and the second frame;
   an adjusting mechanism connected with the first frame and the second frame and configured to be extendable, the adjusting mechanism comprising at least two extendable shafts, and each shaft including a first shaft arm and a second shaft arm pivotally connected with each other via a hinge; and
   a driving mechanism configured to drive and selectably extend the adjusting mechanism;
   an image pick-up sensor disposed on the other one of the first frame and the second frame, the image pick-up sensor being configured for receiving light from the at least one lens, the light corresponding to an image.

2. The digital camera module as claimed in claim 1, wherein the first frame includes a first plate and at least two sliding portions symmetrically extending from a first side of the first plate toward the second frame, the lens barrel being mounted on the first plate.

3. The digital camera module as claimed in claim 2, wherein the second frame includes a second plate and two hollow support portions symmetrically extending from a first side of the second plate toward the first plate, each hollow support portion aligning with and receiving therein a corresponding sliding portion.

4. The digital camera module as claimed in claim 3, wherein each first shaft arm is pivotally connected with the first plate, and each second shaft arm is pivotally connected with the second plate.

5. The digital camera module as claimed in claim 3, wherein the driving mechanism includes a first and second electric magnets capable of aligning with each other, each electric magnet being secured on the hinge of a respective extendable shaft.

6. The digital camera module as claimed in claim 5, further comprising a third and a fourth electric magnets capable of aligning with the first and the second electric magnets, the third and the fourth electric magnets being secured on one respective hollow support portion.

7. The digital camera module as claimed in claim 5, further comprising two resilient members respectively disposed between the first plate and a corresponding hollow support portion, one end of the respective resilient member resisting the first plate, the other end of the respective resilient member resisting the corresponding hollow extending portion.

8. The digital camera module as claimed in claim 7, wherein the respective resilient member is a coil spring, the coil spring being placed round the corresponding sliding portion of the first frame.

9. The digital camera module as claimed in claim 2, wherein each sliding portion is a post.

10. The digital camera module as claimed in claim 3, wherein each hollow support portion is a sleeve.

11. The digital camera module as claimed in claim 2, wherein the first plate defines a through hole configured for receiving the lens barrel therein.

12. The digital camera module as claimed in claim 1, wherein the driving mechanism is configured for selectively using at least one of magnetic attraction and magnetic repulsion for the force needed to move the adjusting mechanism.

* * * * *

UNITED STATES PATENT AND TRADEMARK OFFICE
CERTIFICATE OF CORRECTION

| | | |
|---|---|---|
| PATENT NO. | : 7,551,224 B2 | |
| APPLICATION NO. | : 11/336240 | |
| DATED | : June 23, 2009 | |
| INVENTOR(S) | : Kun-Jung Tsai | |

It is certified that error appears in the above-identified patent and that said Letters Patent is hereby corrected as shown below:

Please replace Section (75) regarding "Inventors" on the front page of the Patent with the following:

(75)　Inventors:　Kun-Jung TSAI, Tu-Cheng (TW).

Signed and Sealed this
Ninth Day of August, 2011

David J. Kappos
*Director of the United States Patent and Trademark Office*